United States Patent Office 3,453,026
Patented July 1, 1969

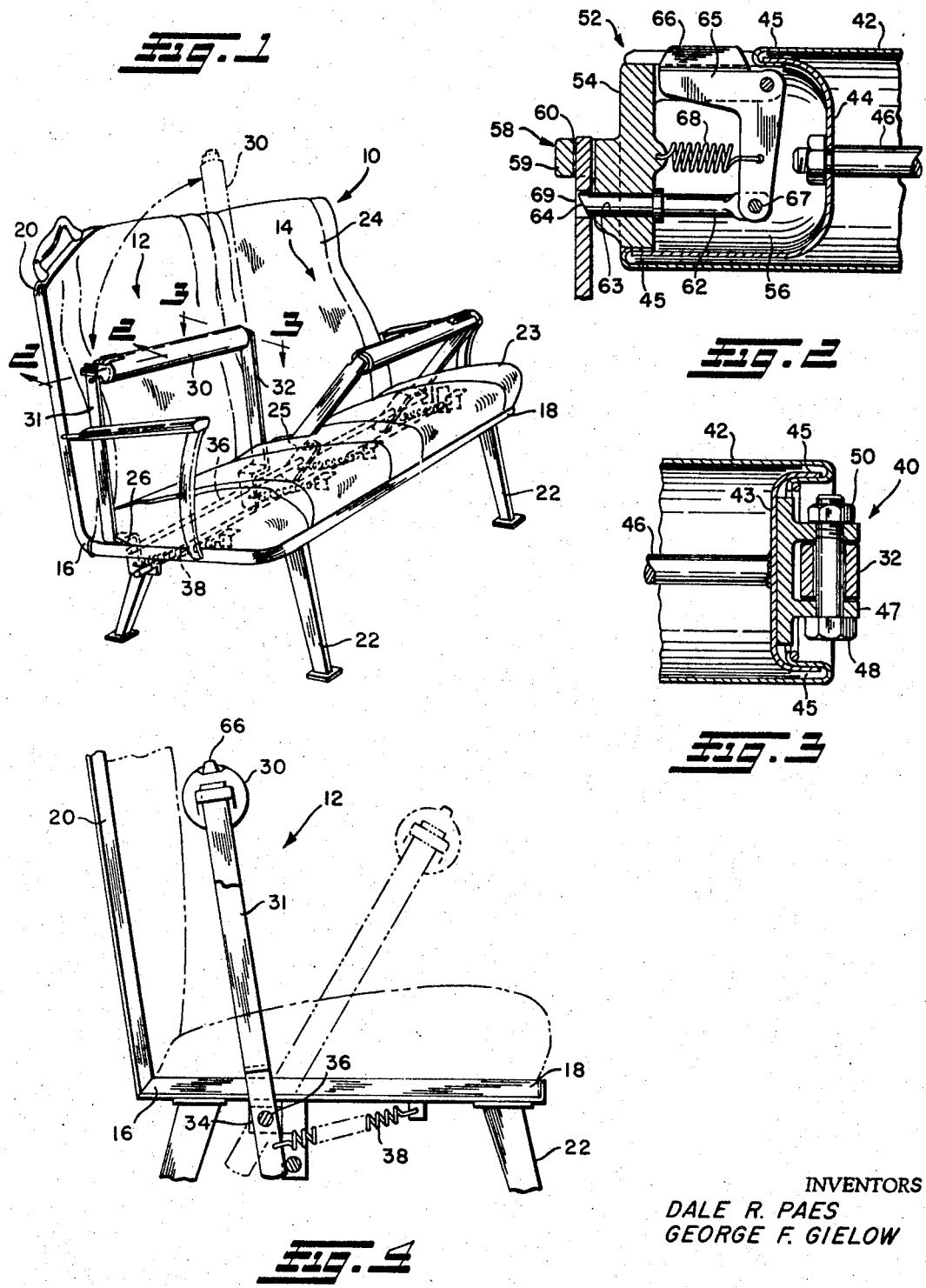

3,453,026
VEHICLE SEAT SAFETY BAR
Dale R. Paes and George F. Gielow, Mansfield, Ohio, assignors to Artnell Company, Chicago, Ill., a corporation of Delaware
Filed Aug. 28, 1967, Ser. No. 663,583
Int. Cl. B60r 21/10; A47d 15/00; A47c 31/00
U.S. Cl. 297—384          6 Claims

ABSTRACT OF THE DISCLOSURE

A passenger restraining device consisting of a pair of links pivotally attached to the framework of a seat and releasably joined by a pivotable bar which in one position secures the passenger in the seat and in the released position allows passenger exit and entry.

---

This invention relates to passenger seats for commercial vehicles and the like and more particularly to a restraining device forming an integral part of the seat or utilizable as an attachment for any type seat.

Although the use of restraining devices has become quite commonplace in light of the recent interest in safety attachments for passenger vehicle seats, most of these devices consist of merely a belt or strap arrangement evidencing an obvious solution to the problem of restraining the passenger in his position of occupancy. Although many variations in these seat belts are seen, most include a simple latch or buckle arrangement and often are inconvenient to use since they may require an adjustment of length of the strap in order to firmly retain the passenger in his seat and also require manipulation of a sturdy connecting device for securing the ends of the straps together. Even though the passenger may become accustomed to these devices over a period of time and form the habit of securing himself in his seat, many times a passenger will not use the safety device offered him or may become confused by the adjustment and latching techniques required of him and unless forced to do so will ignore the use of such restraining device.

Therefore, it is an object of this invention to provide an improved seat bar or restraining device for passenger seats which is comfortable and convenient for the passenger and which requires a minimum of adjustments to firmly secure the passenger in the seat.

It is another object of this invention to provide a seat bar or restraining device of simplified yet sturdy construction which polices its own use in that it is inconvenient for the passenger to occupy the seat without utilizing the restraining device.

It is still another object of this invention to provide a seat bar and restraining device which is readily latched into restraining position and is easily releasable merely by depressing a release lever.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawing setting forth in detail a certain illustrative embodiment of the invention, this being indicative, however, of but one of the various ways in which the principle of the invention may be employed.

In said annexed drawing:

FIG. 1 is a perspective view of a typical passenger seat showing the restraining apparatus of the invention in forward and back latched positions and, in dashed lines, in an unlatched position;

FIG. 2 is an enlarged cross-sectional view of the latching apparatus of the invention located at the outboard end of the restraint bar taken along the lines 2—2 of FIG. 1;

FIG. 3 is an enlarged cross-sectional view of the inboard portion of the restraint bar showing the pivoting mechanism for the bar taken along the lines 3—3 of FIG. 1; and FIG. 4 is a side view of a passenger seat showing the apparatus in forward and back positions and the mounting mechanism for the apparatus.

Referring now to FIG. 1, there is shown a typical dual passenger seat 10 for a commercial vehicle having a pair of independently operable restraining devices 12, 14 mounted thereon. Although a dual seat and dual restraining mechanism is shown, it will be appreciated that the teachings of this invention apply as well to single seats or to plural seats utilizing a single restraining device. Similarly, although one preferred embodiment of the apparatus of the invention is shown, it will be understood that many variations are possible in the construction of this apparatus and it is the intention of the inventor to be not limited to such specific showing. The dual passenger seat 10 shown consists of a metal framework 16 forming the general configuration of a seat 18 and back rest 20 and is firmly attached to the floor of the appropriate vehicle by a plurality of legs 22. Cushioned seats 23 and back rests 24 are secured within the framework 16 and there are provided several openings 25, 26 at the central portion thereof and at either side for positioning of a portion of the apparatus of the invention. Th seats 23, 24 thus define passenger seating areas in which the restraining devices 12, 14 are located.

Each restraining device 12, 14 is identical in construction except for the reversed relationship on either side of the seat 10 and consists of a restraint bar 30 and a pair of links 31, 32 supporting the restraint bar 30 and connecting the bar 30 to a rigid portion of the seat 10. Each pair of links includes an outer and inner link 31, 32, respectively, formed of a piece of rigid material, the outer link 31 preferably being of a bent configuration so that its upper portion may be in the passenger seating area at the side thereof while its lower portion is located in proximity to the framework 16 of the seat 10. As seen in FIG. 2, a plurality of lugs 34 are affixed to the frame 18 of the seat beneath the cushions and are journalled for receipt of a cross-shaft 36 below the framework 16. Each of the inner and outer links 31, 32 is pivotally mounted upon this cross-shaft 36 for forward and backward movement over a limited extent of travel and the inner and outer links 31, 32 may be affixed together by a second shaft at their lower ends or may be rigidly mounted on one-half of the cross-shaft 36 to provide movement in unison. Springs 38 are connected between the framework 16 of the seat 10 and the lower portion of the links 31, 32 below the cross-shaft 36 to bias the portion of the restraining device 12 in the passenger seating area to the rearward direction. A second set of lugs 39 are affixed beneath the framework 16 of the seat and support a shaft 40 against which the lower portions of the links 31, 32 abut, thereby providing a limit for the rearward movement of the restraint bar 30.

The restraint bar 30 of the restraining device 12 is pivotally attached to the inner link 32 by a clevis hinge 40 for pivotal movement between passenger exit and entry positions and a passenger restraining position. When the restraining device 12 is situated near the back seat cushion 24 as shown on the lefthand side of FIG. 1, pivotal movement of the restraint bar 30 will be generally from a horizontal to a vertical position and it is clear that this allows either an obstructed or free access to the passenger seating area. It is clear also that if the restraint bar 30 were left in the lowered position, it would be inconvenient for the passenger to occupy the seat 10 without utilizing such restraining device 12.

The restraint bar 30 is shown in partial cross-sectional views in FIGS. 2 and 3 and consists essentially of a tubular cylindrical member 42 having a pair of cup shaped end sections 43, 44 secured to the tubular member 42 in folded lip connections 45 and secured to each other by a rod 46 of substantial strength, welded to the inner end section 43 and threadedly retaining the outer end section 44.

At the inner end of the restraint bar 30, a clevis hinge 40 is provided to allow pivotal movement of the bar 30, the forked portion 47 of the clevis 40 being fixed to the inner cup section 43 of the restraint bar 30 as by welding or the like and receiving the upper end of the inner link 32. A bolt 48 is passed through aligned apertures in the forked portion 47 and the link 32 and is secured in place by a nut 50. Obviously, this is but one embodiment of a pivotal mounting which might be employed to support the restraint bar 30 and it is contemplated that other suitable arrangements might be utilized including, for instance, a ball type hinge which could allow greater freedom of movement of the restraint bar 30.

The outer end of the restraint bar 30 carries therein a portion of a latching mechanism 52 for securing the restraint bar 30, in its restraining position, to the outer link 31 of the restraining device 12. It is necessary that such mechanism provide the requisite rigidity and strength for resisting high shock forces and yet be a simplified mechanism which is convenient for the passenger to use. In the preferred embodiment of this mechanism, an end plate 54 is securely affixed within the outer portion of the outer cup member 44 to define a housing 56 for the release and latching mechanism 52. A guide member 58 consisting of a yoke 59 integrally formed with the end plate 54 and defining a rectangular opening 60 receives the upper end of the outer link 31 when the restraint bar 30 is lowered to the restraining position. Such guide member 58 serves to bring cooperating members of the latching mechanism 52 on the restraint bar 30 into alignment with the outer link 31.

Such latching mechanism 52 comprises a locking pin 62 slidably mounted in a bore 63 in the end plate 54 of the restraint bar 30 for movement between recessed and extending positions, whereby the angled tip 64 of the locking pin 62 emerges from or is disposed within the end plate 54. A release bar 65 of crank arm configuration is pivotally mounted within the housing 56 and contains an extension member 66 which protrudes through a slot in the housing 56 for actuation by a passenger. The remote end of the release bar crank arm 65 is pivotally attached to the inner end of the locking pin 62 by a screw 67 and a spring 68 is located between the end plate 54 and the remote end of the release bar crank arm 65 to urge the locking pin 62 to an extended position and simultaneously the extension member 66 of the release bar 30 in an upward direction. The upper end of the outer link 31 contains a hole 69 therein in alignment with the locking pin 62 of the restraint bar 30, being guided into cooperative relationship by the guide member 58 and being of a diameter to slidably receive the locking pin 62.

It is clear then that when the restraint bar 30 is in its lowered position, the locking pin 62 will engage the hole 69 in the outer link 31 to prevent upward or downward movement of the restraint bar 30, any lateral movement of the restraint bar 30 from the outer link 31 being prevented by the engagement of the guide member 58 with the upper portion of the outer link 31. When the restraint bar 30 is brought to the lowered position, it is not necessary to manually actuate the release bar 65 since the abutment of the tapered face 64 of the locking pin 62 with the end surface of the outer link 31 will cause a camming of the locking pin 62 into the recessed position allowing the restraint bar 30 to slide in relation to the outer link until the locking pin 62 and the hole 69 come into alignment and the locking pin 62 is urged into locking engagement with the hole 69. Depression of the release bar 65 obviously causes the release bar to rotate in a counter clockwise direction as viewed in FIG. 2 to withdraw the locking pin 62 from the hole 69 into a recessed position thereby allowing relative movement of the restraint bar 30 in relation to the outer link 31.

Other modes of applying the principles of the invention may be employed, change being made as regards the details described, provided the features stated in any of the following claims or the equivalent of such be employed.

We, therefore, particularly point out and distinctly claim as our invention:

1. A seat bar restraining device for passenger vehicles comprising in combination a passenger seat having a frame assembly forming the seat and back rest and seat and back cushions retained in the frame forming a passenger seating area, a pair of links pivotally mounted to a lower portion of the frame assembly and extending upwardly into the passenger seating area, a restraint bar pivotally mounted at one end to one of the pair of links and adapted to be swung between a passenger exit and entry position and a passenger restraining position, and means for releasably securing the restraint bar to the other of the pair of links in the passenger restraining position.

2. A restraining device as set forth in claim 1, wherein the securing means is located in the outer portion of the restraint bar for cooperation with the outer link when the restraint bar is moved to a downward position.

3. A restraining device as set forth in claim 2, wherein the outer link has a hole located near its upper end and the securing means comprises a pin slidably retained in the restraint bar for movement between recessed and extended positions, being normally biased in the extended positions to engage the hole in the outer link when the bar is moved to the restraining position.

4. A restraining device as set forth in claim 3, wherein the securing means further includes a release bar pivotally mounted in the restraint bar for manually actuating the pin between recessed and extended positions.

5. A restraining device as set forth in claim 4, wherein the securing means further includes a guide member formed on the outer end of the restraint bar for engaging the outer link to guide and retain the restraint bar in relation to the outer link.

6. A restraining device as set forth in claim 5 further including bias means connected between the frame assembly and the pair of links for urging the links and the restraining bar to an upward position whereby the bar will lie near the back of the seat in the passenger seating area.

References Cited

UNITED STATES PATENTS

| 296,975 | 4/1884 | Lampton | 297—390 |
|---|---|---|---|
| 1,405,309 | 1/1922 | Matthews | 297—390 |
| 2,346,871 | 4/1944 | Provenzano | 297—390 X |
| 2,750,203 | 6/1956 | Biehler | 297—390 X |
| 2,755,101 | 7/1956 | Budde | 297—390 X |
| 3,198,543 | 8/1965 | Presunka | 297—384 |

FOREIGN PATENTS

| 1,307,758 | 9/1962 | France. |
|---|---|---|
| 1,318,721 | 1/1963 | France. |

JAMES T. McCALL, *Primary Examiner.*

U.S. Cl. X.R.

297—216, 390